3,085,985
POLYMER DISPERSIONS CONTAINING METAL POWDER AND PROCESS FOR THEIR MANUFACTURE

Heinrich Koch and Erich Pfeiffer, Frankfurt am Main, and Anton Fuss, Kriftel in Taunus, Germany, assignors to Farbwerke Hoechst Aktiengesellschaft vormals Meister Lucius & Brüning, Frankfurt am Main, Germany, a corporation of Germany
No Drawing. Filed Aug. 11, 1959, Ser. No. 832,908
Claims priority, application Germany Aug. 16, 1958
9 Claims. (Cl. 260—17)

The present invention relates to aqueous polymer dispersions containing metal powder and a process for their manufacture.

It is known to use metal powders in paints which have been prepared with a base of binding agents dissolved in organic solvents or with a base of drying oils. These paints are available on the market as bronzing liquids, antirust paints or radiator paints. It has, however, not been possible so far to produce metal-powder paints having as a base aqueous polymer dispersions which fulfil the requirements necessary for their practical application, that is to say which are, for example, stable in storage at elevated temperatures of up to about 50° C.

Aqueous dispersion paints containing metal powder have been occasionally produced; the paint systems hitherto obtained had to be used, however, almost immediately after their manufacture because of their poor storability. It has also been proposed to produce satisfactory metal-powder-pigmented paints based on polyvinyl acetate dispersions containing polyvinyl alcohol as emulsifier or stabilizer, by stabilizing the pH value of the said dispersions, for example by adding calcium magnesium carbonate. This proposal proved, however, not successful in practice. The dispersions so obtained can be exposed for a short time, to elevated temperatures, for example about 50° C., without their properties being immediately changed; they possess, however, only a limited stability and are soon decomposed. Analogous or similar properties are exhibited by polyvinyl acetate dispersions which contain surface-active emulsifiers, for example alkylphenyl sulfonates, instead of polyvinyl alcohol, and which are characterized by a latex particle size of less than about 0.5μ. The aforesaid difficulties encountered in the manufacture of metal-containing aqueous paint systems are pointed out, for example, in the leaflet "Celanese Polyvinyl Acetate Emulsions" of September 1956, page 11, paragraph 5, of Celanese Corporation of America.

In spite of the little encouraging results so far obtained, the industry is still greatly interested in the manufacture of storable metal powder-pigmented systems, for example dispersion paints or plastic masses, based on aqueous polymer dispersions in view of the advantages offered by the aqueous dispersions, for example easy and safe processing, good storability and high quality of the final products.

Now we have found that storable dispersion systems containing metal powder can be obtained by using an aqueous polymer dispersion, for example a dispersion of polymers of esters of acrylic or methacrylic acid with saturated, straight-chained or branched aliphatic monohydric alcohols containing 1–8 carbon atoms, a polyvinyl ester dispersion, such as a polyvinyl acetate, polyvinyl propionate, polyvinyl butyrate, polyvinyl laurate, polyvinyl stearate or polyvinyl chloracetate dispersion, advantageously a polyvinyl acetate dispersion, which has been polymerized in the presence of a water-soluble cellulose derivative as protective colloid, preferably hydroxyethyl cellulose (oxethylated cellulose) containing 10 to 40% by weight, advantageously 25 to 35% by weight, of hydroxyethyl groups (oxethyl groups) and which has been adjusted to a stable pH value of about 6 to 7 by adding an appropriate buffer substance, preferably calcium magnesium carbonate. A chemically very pure natural calcium magnesium carbonate which has been ground very finely and has a uniform distribution of particle size and a specific gravity of about 2.85 constitutes an especially suitable buffer substance; a product of this kind is, for example, "Microdol" (registered trademark) manufactured by Norwegian Talc, Bergen.

For the preparation of the products of the invention there may be used with special advantage polyvinyl ester dispersions, advantageously polyvinyl acetate dispersions, which, besides containing water-soluble cellulose derivatives—the water-soluble cellulose derivative being already present during the polymerization—and having a stabilized pH of about 6 to 7, are further characterized by electrolyte compatibility and a latex particle size within the range of about 0.5 to 15μ, for example dispersions obtained by the process of U.S. patent application Ser. No. 700,504 filed December 3, 1957, now abandoned.

There may be used dispersions containing homo- or copolymers, for example copolymers prepared from at least two vinyl esters such as vinyl acetate, vinyl propionate, vinyl butyrate, vinyl laurate, vinyl stearate or vinyl chloracetate, or copolymers of these vinyl esters with other monomers such as esters of unsaturated dicarboxylic acids, for example maleic acid, fumaric acid or itaconic acid, and alcohols of which the carbon chain contains advantageously 1 to 8 carbon atoms in a linear or branched chain, for example methyl alcohol, the various isomers of butanol, of hexanol such as 2-ethylbutanol-(1), of octanol such as 5-ethyl-hexanol-(1). It is generally advantageous to add an appropriate softener, for example dibutyl phthalate or tricresyl phosphate, to the polymer dispersions. The quantity of softener to be added varies with the end use of the dispersion systems. In general, an addition up to 25% of plasticizer, calculated on the weight of the polymer, is sufficient. To facilitate storage, it is often advisable in practice to adjust the most advantageous degree of softening by mixing polyvinyl ester dispersions containing a softener and polyvinyl ester dispersions free from softener with one another in an appropriate proportion.

The most varying effects can be obtained by making an appropriate choice from the variety of metal powders suitable for the pigmentation. There may be used, for example, powders of copper-zinc-nickel alloys, powders of copper alloys or copper-zinc alloys and preferably aluminum powder. As regards the properties of the metal powders, leafing and nonleafing metal powders are, for example, known. The metal powders may further be used in different degrees of fineness. Metal powders passing a screen of 1000 to 10,000 mesh/cm.$^2$ are most advantageous. Metal powders of small grain size yield relatively dark colors while the metal character dominates when large particles of metal powder are used. The metal powders used for pigmenting paints are often designated as "bronzes." Particulars as to the properties and application of these "bronzes" are given by H. Wulf in "Farbwarenkunde," Verlagsgesellschaft Rudolf Müller, Köln-Braunsfeld, page 146 et seq. and page 256 et seq. In general, it is of advantage to use 30 to 100 parts of metal powder for 100 parts of polymer contained in the dispersion; in special cases, a greater or smaller quantity of metal powder may, of course, be used. The dispersions pigmented with metal powder may be colored with organic and/or inorganic dyestuffs, for example iron oxide red, chrome oxide green, azo dyestuffs or dyestuffs of the phthalocyanine group in order to obtain special metal color effects.

When the dispersion systems of the present invention are to be used as paints, the viscosity should not be too high, if possible, in order to ensure good leafing of the metal powder particles. Paints which are to be applied to a base by spraying or by means of a roll advantageously have a viscosity which corresponds to a time of flow of about 20 to 30 seconds measured with a Ford viscosimeter having a 6 mm.-nozzle. An examination of the influence exerted by the different powders on the appearance of the finished coat of paint showed that a dispersion paint which had been prepared, for example, with the use of leafing aluminum powder and had been colored with an organic dyestuff, more especially a dyestuff paste, exhibited above all a pronounced metal effect. When, however, a dispersion paint is prepared with nonleafing aluminum powder and colored with the same dyestuff paste, the dyestuff dominates and a colored metal effect is obtained. When an organic wetting agent, for example an alkali metal salt of polyacrylic acid, advantageously an ammonium salt of a vinyl acetate/crotonic acid copolymer which has advantageously been prepared from 95% by weight of vinyl acetate and 5% by weight of crotonic acid, is added to the colored dispersion systems prepared with a leafing or nonleafing aluminum powder, the aforesaid components, i.e. the aluminum powder and the organic dyestuff, are both simultaneously wetted. In the case of the dispersion paint containing leafing aluminum powder, the metal effect is reduced in favor of the dyestuff which has been concomitantly used and a colored metal effect is obtained. In the case of the dispersion paint containing nonleafing aluminum powder, the metal effect becomes more pronounced since the nonleafing aluminum powder is also wetted and the effect of the dyestuff which initially dominated is diminished.

In many cases it is of advantage to add water-soluble cellulose derivatives, for example methyl cellulose, to the dispersion systems in order to regulate the so-called open time.

The dispersion systems obtained by the process of the invention are characterized in that films or plastic masses made thereof have very little tendency to contaminate.

The dispersion systems prepared according to the process of the invention and containing wetting agents which are to be used as paints have the further advantage that a so-called two-color effect can be obtained by spraying a dispersion containing nonleafing aluminum powder and a wetting agent on a relief-shaped base. The aluminum powder remains on the projecting parts of the relief-shaped base while the dyestuff accumulates in the recesses. The wetting agents added produce a simultaneous wetting of the aluminum powder, the dyestuff and other fillers which may be present, for example calcium magnesium carbonate, barium sulfate or calcium carbonate, and also bring about a good flow of the dispersion paints. Leafing of the metal powder over the relief-shaped base can be achieved only in this manner.

If the dispersion systems obtained by the process of the invention are to be used as plastic masses having a two-color effect, leafing metal powder is used but no wetting agent is added, contrary to the preparation of a dispersion paint giving a two-color effect. If a wetting agent were present, the latter would simultaneously wet the metal powder, the shading dyestuff and any fillers possibly present and thus prevent the formation of a plastic mass exhibiting a two-color effect.

The process of the present invention permits to prepare for the first time a plastic mass containing metal powder in a single-pot process, i.e. a plastic mass which yields a two-color effect in a single operation. The plastic mass prepared in accordance with the present invention is applied as usual and the surface is treated in known manner, for example by pricking with a brush or by modeling with a roll. The metal powder deposits on the projecting parts of the plastic mass and the dyestuff in the recesses. In this manner a multicolor effect is obtained in a simple way. With the known plastic masses a two-color effect could be produced only in several complicated operations.

In detail the polymer dispersions containing metal powder may be prepared, for example, as follows:

The metal powder and the calcium magnesium carbonate are made into a paste with water, the solution of the wetting agent and the methyl cellulose solution. The mass is stirred until homogeneous. Stirring may be carried out in a stirrer of at most 1500 r.p.m. or, in the case of relatively small quantities, by hand. It is of advantage to homogenize the mass not longer than necessary in order to avoid changes in the surface structure of the particles of the metal powder. After the paste has been prepared in the aforesaid manner, the polymer dispersion, preferably a polyvinyl acetate dispersion, is slowly added while stirring.

A further modification of the process of the invention comprises first thoroughly mixing the polymer dispersion, a methyl cellulose solution and an appropriate amount of water. The calcium magnesium carbonate and the fillers are then slowly stirred in and well distributed and the dyestuffs are subsequently added. After the mass is well homogenized, the aluminum powder is sprinkled in. After stirring for a short time, the preparation of the plastic mass is finished.

The following examples serve to illustrate the invention but they are not intended to limit it thereto, the parts being by weight and the percentages being also by weight:

EXAMPLE 1

*Dispersion Paint Containing Nonleafing Aluminum Powder*

450 parts of an aqueous polyvinyl acetate dispersion of 60% strength obtained by the process of the above mentioned patent application and containing 47.5% of polyvinyl acetate and 10% of dibutyl phthalate as softener 150 parts of an aqueous polyvinyl acetate dispersion of 56% strength free from plasticizer, which has also been prepared according to the process of the above mentioned patent application 50 parts of calcium magnesium carbonate 60–100 parts of nonleafing aluminum powder 130 parts of an aqueous solution of 25% strength of the ammonium salt of a copolymer prepared from 95 parts of vinyl acetate and 5 parts of crotonic acid 60 parts of an aqueous methyl cellulose solution of 2% strength having a viscosity of 1000 centipoises at 20° C.

80–90 parts of water are mixed as follows: The aluminum powder and the calcium magnesium carbonate are made into a paste with water, the solution of the wetting agent and the methyl cellulose solution. The mass is stirred until homogeneous. Stirring may be carried out in a stirrer of at most 1500 r.p.m. or, in the case of relatively small quantities, by hand. It is of advantage to homogenize the mass not longer than necessary in order to avoid changes in the surface structure of the particles of the metal powder. After the paste has been prepared in the aforesaid manner, the polyvinyl acetate dispersion is slowly added while stirring.

It may be of great advantage in special cases to add a defoamer, for example turpentine, in order to prevent the dispersion paint from forming blisters on application with a roll.

EXAMPLE 2

*Dispersion Paint Containing Leafing Aluminum Powder*

450 parts of an aqueous polyvinyl acetate dispersion of 60% strength obtained by the process of the aforesaid patent application and containing 47.5% of polyvinyl acetate and 10% of dibutyl phthalate as softener 150 parts of an aqueous polyvinyl acetate dispersion of 56% strength free from softener, which has also been obtained by the process of the aforesaid patent application
50 parts of calcium magnesium carbonate
60–100 parts of leafing aluminum powder
130 parts of an aqueous solution of 25% strength of the ammonium salt of a copolymer prepared from 95 parts of vinyl acetate and 5 parts of crotonic acid
60 parts of an aqueous methyl cellulose solution of 2% strength having a viscosity of 1000 centipoises at 20° C.
80–90 parts of water.

The individual components are added as described in Example 1.

EXAMPLE 3

*Dispersion Paint Containing Nonleafing Aluminum Powder and Colored With an Organic Dyestuff*

450 parts of an aqueous polyvinyl acetate dispersion of 60% strength obtained by the process of the aforesaid patent applictaion and containing 47.5% of polyvinyl acetate and 10% of dibutyl phthalate as softener
150 parts of an aqueous polyvinyl acetate dispersion of 56% strength free from softener, which has also been obtained by the process of the aforesaid patent application
50 parts of calcium magnesium carbonate
60–100 parts of nonleafing aluminum powder
130 parts of an aqueous solution of 25% strength of the ammonium salt of a copolymer prepared from 95 parts of vinyl acetate and 5 parts of crotonic acid
60 parts of an aqueous methyl cellulose solution of 2% strength having a viscosity of 1000 centipoises at 20° C.
80–90 parts of water
3 parts of a paste of phthalocyanine blue of a solid content of about 40%.

The individual components are added as described in Example 1; the shading dyestuff is added at the end.

EXAMPLE 4

*Dispersion Paint Containing Nonleafing Aluminum Powder and Colored With an Inorganic Dyestuff*

450 parts of an anqueous polyvinyl acetate dispersion of 60% strength obtained by the process of the aforesaid patent application and containing 47.5% of polyvinyl acetate and 10% of dibutyl phthalate as softener
150 parts of an aqueous polyvinyl acetate dispersion of 56% strength free from softener, which has also been obtained by the process of the aforesaid patent application
50 parts of calcium magnesium carbonate
60–100 parts of nonleafing aluminum powder
130 parts of an aqueous solution of 25% strength of the ammonium salt of a copolymer prepared from 95 parts of vinyl acetate and 5 parts of crotonic acid
60 parts of an aqueous methyl cellulose solution of 2% strength having a viscosity of 1000 centipoises at 20° C.
80–90 parts of water
15 parts of a paste of chromium oxide green having a solid content of about 60%.

The dispersion paint is prepared as described in Example 3.

EXAMPLE 5

*Plastic Mass "Silver" According to a Single-Pot Process*

50 parts of an aqueous polyvinyl acetate dispersion of 60% strength obtained by the process of the aforesaid patent application and containing 20% of dibutyl phthalate as softener.
200 parts of an aqueous methyl cellulose solution of 2% strength having a viscosity of 1000 centipoises at 20° C.
60 parts of water
150 parts of calcium carbonate (plastic chalk)
250 parts of ground natural barium sulfate
20–40 parts of a paste of 50% strength of a red organic dyestuff prepared, for example, by coupling diazotized 2,4,5-trichloro-aniline with β-hydroxy-naphthoic acid-o-toluidide
150 parts of leafing aluminum powder
50 parts of calcium magnesium carbonate.

The polyvinyl acetate dispersion, the methyl cellulose solution and the indicated amount of water are thoroughly mixed with one another. The fillers are then slowly stirred in and well distributed and the dyestuffs are subsequently added. After the mass is well homogenized, the aluminum powder is sprinkled in. After stirring for a short time, the preparation of the plastic mass is finished.

EXAMPLE 6

*Plastic Mass "Gold" According to a Single-Pot Process*

500 parts of an aqueous polyvinyl acetate dispersion of 60% strength obtained by the process of the aforesaid patent application and containing 20% of dibutyl phthalate as softener.
200 parts of an aqueous methyl cellulose solution of 2% strength having a viscosity of 1000 centipoises at 20° C.
60 parts of water
150 parts of calcium carbonate (plastic chalk)
250 parts of ground natural barium sulfate
20–30 parts of a paste of phthalocyanine green having a solid content of about 50%.
200–300 parts of leafing powder of a copper-zinc alloy
100 parts of turpentine
50 parts of calcium magnesium carbonate.

The individual components are added as described in Example 5. In order to promote leafing of the metal powder, the latter is made into a paste with turpentine before being added.

EXAMPLE 7

*Plastic Mass "Gold" According to a Single-Pot Process*

500 parts of an aqueous polyvinyl acetate dispersion of 60% strength obtained by the process of the aforesaid patent application and containing 20% of dibutyl phthalate as softener.
200 parts of an aqueous methyl cellulose solution of 2% strength having a viscosity of 1000 centipoises at 20° C.
60 parts of water
150 parts of calcium carbonate (plastic chalk)
250 parts of ground natural barium sulfate
20–30 parts of a paste of 50% strength of a red organic dyestuff obtained, for example, by coupling diazotized 2,4,5-trichloroaniline with β-hydroxy-naphthoic acid-o-toluidide
200–300 parts of leafing powder of a copper-zinc-alloy
100 parts of turpentine
50 parts of calcium magnesium carbonate.

The plastic mass is prepared as described in Example 6.

EXAMPLE 8

*Plastic Mass "Silver" According to a Single-Pot Process*

500 parts of an aqueous dispersion of 60% strength of a copolymer from vinyl acetate and maleic acid dibutyl ester obtained by the process of the aforesaid patent application and containing 20% of dibutyl phthalate as softener.
200 parts of an aqueous methyl cellulose solution of 2% strength having a viscosity of 1000 centipoises at 20° C.
60 parts of water
150 parts of calcium carbonate (plastic chalk)
250 parts of ground natural barium sulfide
20–40 parts of a paste of 50% strength of a red organic dyestuff obtained, for example, by coupling diazotized 2,4,5-trichloroaniline with β-hydroxy-naphthoic acid-o-toluidide
150 parts of leafing aluminum powder
50 parts of calcium magnesium carbonate.

The individual components are added as described in Example 5.

EXAMPLE 9

*Plastic Mass "Gold" According to a Single-Pot Process*

500 parts of an aqueous polyvinyl acetate dispersion of 60% strength obtained by the process of the aforesaid patent application and containing 20% of dibutyl phthalate as softener.
200 parts of an aqueous methyl cellulose solution of 2% strength having a viscosity of 1000 centipoises at 20° C.
50 parts of calcium magnesium carbonate
75 parts of water
315 parts of calcium carbonate (plastic chalk)
250 parts of ground natural barium sulfate
30 parts of a paste of 50% strength of a red organic dyestuff prepared, for example, by coupling diazotized 2,4,5-trichloroaniline with β-hydroxy-naphthoic acid-o-toluidide
66 parts of white spirit
10 parts of linseed oil for varnish
200 parts of leafing powder of a copper-zinc alloy.

The individual components are added as described in Example 5. In order to promote leafing of the metal powder, the latter is made into a paste with the solution of white spirit and linseed oil before being added.

EXAMPLE 10

*Plastic Mass "Gold" According to a Single-Pot Process*

500 parts of an aqueous polyvinyl acetate dispersion of 60% strength obtained by the process of the aforesaid patent application and containing 20% of dibutyl phthalate as softener
200 parts of an aqueous methyl cellulose solution of 2% strength having a viscosity of 1000 centipoises at 20° C.
50 parts of calcium magnesium carbonate
315 parts of calcium carbonate (plastic chalk)
250 parts of ground natural barium sulfate
30 parts of a paste of 50% strength of a red organic dyestuff obtained, for example, by coupling diazotized 2,4,5-trichloroaniline with β-hydroxy-naphthoic acid-o-toluidide
82 parts of aluminum stearate in white spirit (5%)
200 parts of powder of a copper-zinc alloy.

The individual components are added as described in Example 5. In order to promote leafing of the metal powder, the latter is made into a paste with the dispersion of aluminum stearate and white spirit before being added.

In view of the presence of the metal powder, it is not advantageous in general to mix the plastic masses described in Examples 5 to 10 on a roller mill.

We claim:

1. A stable metal-pigmented composition adaptable to prolonged storage without decomposition, but free of metal-stabilizing agents, said composition comprising powdered aluminum added to an aqueous dispersion of polyvinyl acetate having a latex particle size between 0.5 and 15 microns, said polymer dispersion being prepared by polymerization of vinyl acetate in the presence of hydroxyethyl cellulose as a protective colloid, said pigmented composition being buffered at a pH of about 6–7 by addition thereto, after preparation of said polymer dispersion, of calcium magnesium carbonate and containing 30–100 parts by weight of powdered aluminum to 100 parts by weight of polyvinyl acetate.

2. A composition as in claim 1 in which methyl cellulose is additionally present to control the open time of the composition.

3. A composition as in claim 1 wherein said powdered aluminum is leafing.

4. A composition as in claim 1 wherein said powdered aluminum is non-leafing.

5. A stable metal-pigmented composition adaptable to prolonged storage without decomposition, but free of metal-stabilizing agents, said composition comprising a pigmenting bronze added to an aqueous polymer dispersion of a member selected from the group consisting of polymers of acrylic and methacrylic acid esters of aliphatic monohydric alcohols having 1–8 carbon atoms, homopolymers of vinyl esters of saturated aliphatic monocarboxylic acids having 2–18 carbon atoms, and copolymers of said vinyl esters with esters formed between an aliphatic monohydric alcohol having 1–8 carbon atoms and an acid selected from the group consisting of maleic, fumaric, and itaconic acids, said polymer dispersion being prepared by polymerization of monomers in the presence of hydroxyethyl cellulose as a protective colloid, said pigmented composition being buffered at a pH of about 6–7 by addition thereto, after preparation of said polymer dispersion, of calcium magnesium carbonate and containing 30–100 parts by weight of said pigmenting bronze to 100 parts by weight of polymer in said polymer dispersion.

6. A composition as in claim 5 wherein said polymer is polyvinyl acetate.

7. A method of making a stable metal-pigmented composition adaptable to prolonged storage, but free of metal-stabilizing agents, which method comprises dispersing a pigmenting bronze, calcium magnesium carbonate, and methyl cellulose in an aqueous polymer dispersion of a member selected from the group consisting of polymers of acrylic and methacrylic acid esters of aliphatic monohydric alcohols having 1–8 carbon atoms, homopolymers of vinyl esters of saturated aliphatic monocarboxylic acids having 2–18 carbon atoms, and copolymers of said vinyl esters with esters formed between an aliphatic monohydric alcohol having 1–8 carbon atoms and an acid selected from the group consisting of maleic, fumaric, and itaconic acids, said polymer dispersion being prepared by polymerization of monomers in the presence of hydroxyethyl cellulose as a protective colloid, said pigmenting bronze being added in amounts of from 30–100 parts by weight to 100 parts by weight of said polymer, said calcium magnesium carbonate being present in amounts buffering said composition at a pH of about 6–7, and said methyl cellulose being present to control the open time of the composition.

8. A method as in claim 7 wherein said pigmenting bronze, calcium magnesium carbonate, and aqueous methyl cellulose are first combined as an homogeneous paste in the presence of an aqueous solution of a wetting agent consisting of the ammonium salt of a copolymer of vinyl acetate and crotonic acid, and said paste and said aqueous polymer dispersion are then combined.

9. A method as in claim 7 wherein methyl cellulose is first added to said aqueous polymer dispersion, calcium magnesium carbonate is next combined therewith and homogenized, and then said pigmenting bronze is sprinkled into the resulting homogeneous mixture.

References Cited in the file of this patent

UNITED STATES PATENTS

| | | |
|---|---|---|
| 2,709,689 | Herzog et al. | May 31, 1955 |
| 2,809,945 | Wright et al. | Oct. 15, 1957 |
| 2,858,230 | Knoll et al. | Oct. 28, 1958 |
| 2,886,474 | Kine et al. | May 12, 1959 |
| 2,904,523 | Hawkins et al. | Sept. 15, 1959 |
| 3,010,929 | Jones | Nov. 28, 1961 |

FOREIGN PATENTS

| | | |
|---|---|---|
| 658,426 | Great Britain | Oct. 10, 1951 |